US010155338B2

(12) United States Patent
Chauvin et al.

(10) Patent No.: US 10,155,338 B2
(45) Date of Patent: Dec. 18, 2018

(54) APPARATUS AND METHOD FOR FABRICATION CONTAINERS

(71) Applicant: DISCMA AG, Zürich (CH)

(72) Inventors: Guillaume Chauvin, Duchess Manor (SG); Damien Kannengiesser, Golbey (FR)

(73) Assignee: Discma AG, Zürich (CH)

( * ) Notice: Subject to any disclaimer, the term of this patent is extended or adjusted under 35 U.S.C. 154(b) by 275 days.

(21) Appl. No.: 14/889,682

(22) PCT Filed: May 6, 2014

(86) PCT No.: PCT/EP2014/059147
§ 371 (c)(1),
(2) Date: Nov. 6, 2015

(87) PCT Pub. No.: WO2014/180800
PCT Pub. Date: Nov. 13, 2014

(65) Prior Publication Data
US 2016/0082644 A1    Mar. 24, 2016

(30) Foreign Application Priority Data

May 7, 2013   (EP) .................................... 13166852

(51) Int. Cl.
*B29C 49/58* (2006.01)
*B29C 49/46* (2006.01)
(Continued)

(52) U.S. Cl.
CPC .............. *B29C 49/46* (2013.01); *B29C 49/12* (2013.01); *B29C 49/28* (2013.01); *B29C 49/56* (2013.01); *B29C 49/58* (2013.01); *B29C 49/70* (2013.01); *B65D 1/00* (2013.01); *B29C 2049/465* (2013.01); *B29C 2049/4652* (2013.01); *B29C 2049/4655* (2013.01); (Continued)

(58) Field of Classification Search
None
See application file for complete search history.

(56) References Cited

U.S. PATENT DOCUMENTS 3,767,341 A   10/1973   Siebelhoff et al.
4,071,128 A   1/1978    Schmeisser et al.
(Continued)

FOREIGN PATENT DOCUMENTS

WO   2012170517   12/2012

*Primary Examiner* — Monica A Huson
(74) *Attorney, Agent, or Firm* — Eric J. Sosenko; Jonathan P. O'Brien; Honigman Miller Schwartz and Cohn LLP

(57) ABSTRACT

An apparatus for fabricating containers. The apparatus including a plurality of mold segments, an injection cylinder, a closure cylinder and a motor cylinder. The injection cylinder defining a mold cavity substantially in the form of a container and accommodating a substantially tubular preform having a preform cavity in communication with an open end. The injection head establishes fluid communication with the preform and the injection cylinder is in fluid communication with the injection head and configured to inject a volume of liquid into the preform The closure cylinder is configured to exert a force on at least one of the mold segments to maintain them in a closed disposition. The motor cylinder is configured to drive the injection cylinder and being itself concurrently driven with the closure cylinder by a single pressure source.

14 Claims, 1 Drawing Sheet

(51) Int. Cl.
  *B29C 49/12* (2006.01)
  *B29C 49/56* (2006.01)
  *B29C 49/28* (2006.01)
  *B29C 49/70* (2006.01)
  *B65D 1/00* (2006.01)
  *B29K 105/00* (2006.01)
  *B29L 31/00* (2006.01)

(52) U.S. Cl.
  CPC ............... *B29C 2049/4664* (2013.01); *B29C 2049/563* (2013.01); *B29C 2049/5868* (2013.01); *B29K 2105/258* (2013.01); *B29L 2031/712* (2013.01)

(56) References Cited

U.S. PATENT DOCUMENTS 5,269,985 A  12/1993  Kanou et al.
2012/0098166 A1  4/2012  Voth

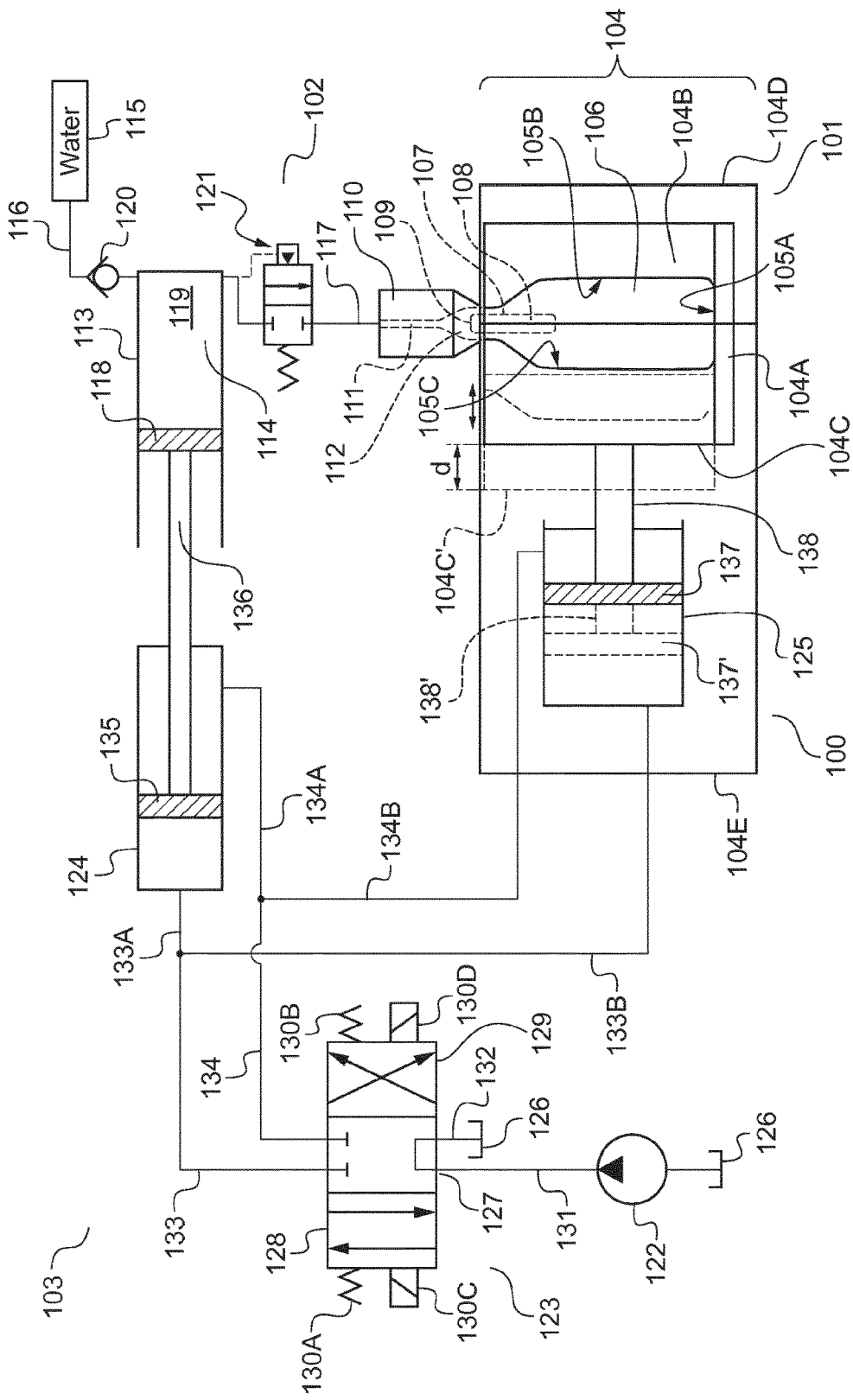

APPARATUS AND METHOD FOR FABRICATION CONTAINERS

CROSS-REFERENCE TO RELATED APPLICATIONS

This application is the U.S. national phase of PCT Application No. PCT/EP2014/059147 filed on May 6, 2014, and claims priority to EP13166852.7 filed on May 7, 2013, the entire disclosures of which are herein incorporated by reference herein.

TECHNICAL FIELD

The invention relates to an apparatus for the fabrication of containers, specifically by the process of blow molding. The invention also relates to a method for employing such an apparatus to fabricate containers, as well as the containers so produced.

BACKGROUND OF THE INVENTION

It is generally well known in the art to fabricate containers by the process of blow molding, wherein a plastic parison known as a "preform" is molded into a container. This preform is generally in the form of an elongated tube which defines a preform cavity and which is provided with a closed distal end and a mouth at an open proximal end in communication with said preform cavity. The preform may be fabricated from any polymer resin which has appropriate deformation characteristics; polyethylene terephthalate (PET) and polypropylene (PP) are particularly favored for their deformation properties and suitability for use with alimentary products.

The preform is first placed in a mold which defines a mold cavity in the form of a container. The mold is usually provided in at least two segments, ideally configured such that the open proximal end of the preform protrudes from the mold while a majority of the preform remains within the mold cavity. A pressurized fluid is then injected into the preform cavity, which induces it to expand and assume the contours of the mold, thereby forming a container.

When forming a container by the blow molding process, it is necessary to ensure that the segments of the mold are held together tightly at the end of the forming process where the preform is in contact with the interior of the mold and is exerting an outward force upon the mold surfaces. Otherwise, the force exerted by the preform on the surface of the mold cavity as it is formed will cause the mold segments to separate and result in the undesirable formation of prominent parting lines in the container.

In known embodiments of the blow molding process, the expansion of the preform is made by the injection of compressed air. To maintain tight closure of the mold segments, one or several compensation chambers, for instance pneumatic cylinders, are provided in one or more of the mold segments to press or clamp the mold segments together, the compensation chambers being fed from the same compressed air supply as the molding apparatus. Preferably, one mold segment is held stationary while the other is pressed against it by the pneumatic cylinder.

However, it has recently become known to make the expansion of the preform by the injection of a liquid, in particular the liquid which is ultimately to be packaged in the container thereby fabricated. In a blow molding apparatus so configured, there is thus no supply of compressed air, requiring an alternate means for ensuring the closure of the mold segments to be furnished so as to avoid the formation of parting lines on the containers being produced.

In particular, the international patent application publication WO 2012/0170517 describes a system wherein there is provided a means for driving a hydraulic cylinder placed in abutment to one of the mold segments, thereby ensuring the proper closure of the mold during the injection step. In one embodiment, the injection liquid and the hydraulic cylinder are bridged by an isolator device. The isolator device comprises a diaphragm or piston disposed in an injection head of the apparatus and acted upon directly by the injection liquid, thereby pressurizing the hydraulic fluid and driving the hydraulic cylinder. This embodiment is particularly appealing in that only one pressure source is employed. In an alternate embodiment, the hydraulic circuit is isolated from the injection liquid and driven by a separate pressure source.

However, the systems described in the prior art do not satisfactorily resolve the problem of ensuring the proper closure of the mold segments.

Specifically, the apparatus of the prior art reference is constrained in that the pressure for driving the compensation mechanism is limited by the pressure of injection of the liquid into the preform. Thus, in order to generate a sufficient force on the mold segments to hold the mold closed during injection, the principle of hydraulic force multiplication dictates that the area of the isolator upon which the pressure of the injection fluid acts must necessarily be greater than the area of the projection of the container onto the plane normal to the direction of motion of the mold segment. In practice, this means that the surface area of the plunger, piston, or diaphragm of the isolator must exceed the area of the longitudinal section of the container being formed for the compensation mechanism to provide enough force to keep the mold closed during the forming process. The isolator unit and injection head are very large and unwieldy as a result.

It is therefore an object of the invention to provide an apparatus which employs a single pressure source to ensure the closure of a mold during the blow molding of a container within, and which is compact and reliable.

SUMMARY OF THE INVENTION

In a first aspect of the invention, there is provided an apparatus for fabricating containers, comprising a plurality of mold segments, said plurality of mold segments defining a mold cavity substantially in the form of a container and configured to accommodate a substantially tubular preform having a preform cavity communicating with an open end; an injection cylinder, said injection cylinder comprising a chamber with a piston mobile therein and being disposed in fluid communication with said injection head, and further configured to inject a volume of liquid into said preform when said piston is advanced into said chamber; and a closure cylinder, said closure cylinder being configured to exert a force on at least one of the mold segments so as to maintain said mold segments in a closed disposition.

According to the invention, the apparatus further comprises a motor cylinder, the piston of said motor cylinder driving said piston of said injection cylinder, the motor cylinder and closure cylinder being concurrently driven by a single pressure source.

Thanks to the provision of the motor cylinder driving the injection cylinder, and the closure cylinder holding the mold closed during the molding process, the molding apparatus is rendered more compact while achieving a high level of quality in the containers produced therein.

Specifically, the provision of a motor cylinder to drive the injection cylinder means that rather than the injection liquid being pressurized and driving the closure cylinder indirectly through an isolator, the injection of the liquid into the preform and the closure of the mold are effectuated separately by a single hydraulic pressure source. There is thus no need to provide an isolator in the injection head of the apparatus to bridge the pressurized injection liquid and the hydraulic fluid driving the closure cylinder, thereby rendering the apparatus simpler and more compact.

In a preferred embodiment, said injection cylinder and said motor cylinder are provided as two separate components.

This is advantageous in that providing the motor cylinder and the injection cylinder as two separate components will maintain the hydraulic fluid and the injection liquid in perfect isolation from each other. Specifically, when the motor cylinder and the injection cylinder are provided as separate components, there will necessarily be a physical separation between the two that, when properly configured, will eliminate the possibility of cross-contamination between the hydraulic fluid and the injection liquid such as would occur across a piston ring seal or through a cracked or otherwise damaged diaphragm in an isolator according to the prior art. The integrity of the fluids within the apparatus is thereby maintained with maximal effectiveness.

Advantageously, the piston of said motor cylinder is directly connected to the piston of said injection cylinder.

This is advantageous in that it will result in an efficient transfer of power between the motor cylinder and the injection cylinder, while simultaneously reducing the complexity and cost of the apparatus.

As a practical embodiment, said motor cylinder and said closing cylinder are double-acting cylinders.

This is advantageous in that by furnishing the appropriate hydraulic control mechanisms, the apparatus is quickly and easily reset to an initial position following the fabrication of a container, facilitating the rapid and continuous production of containers. In particular, it may be advantageous to utilize the return stroke of the motor cylinder to cause the injection cylinder to draw in another volume of liquid for injection in a subsequent container fabrication cycle.

In a second aspect of the invention, the invention is directed to a method for the fabrication of a container, comprising the steps of providing a substantially tubular preform having a preform cavity communicating with an open end; disposing said preform at least partially within a mold cavity substantially in the form of a container, said mold cavity defined by a plurality of mold segments; pressurizing a motor cylinder, a piston thereof driving a piston of an injection cylinder and thereby pressurizing a quantity of liquid within said injection cylinder, while concurrently pressurizing a closing cylinder adapted to exert a force upon at least one of said mold segments and thereby maintain said mold segments in a closed disposition; and injecting said quantity of liquid within said injection cylinder into said preform cavity of said preform, said preform being thereby induced to deform and assume the shape of the mold cavity.

This is advantageous in that it realizes the advantages of the apparatus as described above in the production of containers.

According to a possible embodiment, the method is further characterized in that after the injecting step, there is a retracting step for retracting the pistons of said motor cylinder and closing cylinder.

This is advantageous in that such a step will reset the apparatus, readying it to fabricate another container from a subsequent preform. This will reduce the amount of time during each cycle where a container is not being fabricated, thereby maximizing the production of containers and rendering the implementation of the method more efficient.

Preferably, during said retraction step a volume of liquid is drawn into said injection cylinder.

This is advantageous in that the injection cylinder is thereby primed for the forming and filling of a container in a subsequent cycle.

In a possible embodiment, the method is further characterized in that initiating prior and taking place concurrent to the injecting step there is a step for advancing a stretching rod into said preform cavity of said preform, said stretching rod being urged against the surface of said preform cavity so as to induce said preform to deform along a longitudinal axis.

This is advantageous in that the provision of the stretching rod and the advancement thereof into the preform during the injecting step will promote the longitudinal expansion of the preform. This enables the production of more varied forms of containers by the method of the invention, while permitting a greater degree of control over the process by the user.

In a third aspect of the invention, the directed to a container fabricated by the method described above.

This is advantageous in that such a container embodies the advantages of the invention as previously detailed.

BRIEF DESCRIPTION OF THE FIGURE

FIG. 1 is a schematic depiction of an apparatus for fabricating containers according to an exemplary embodiment of the invention.

DETAILED DESCRIPTION

For a complete understanding of the present invention and the advantages thereof, reference is made to the following detailed description of the invention.

It should be appreciated that various embodiments of the present invention can be combined with other embodiments of the invention and are merely illustrative of the specific ways to make and use the invention and do not limit the scope of the invention when taken into consideration with the claims and the following detailed description.

In the present description, the following words are given a definition that should be taken into account when reading and interpreting the description, examples and claims:

"Closure Cylinder" is a piston-like device acting upon a mold, the closure cylinder being disposed so as to compress or otherwise hold together the mold halves during the deformation of a preform within said mold;

"Injection Liquid" is the liquid which is injected at pressure into the preform so as to induce it to deform into the shape of a container, and which is generally edible and intended to be packaged within the container so formed; and "Pressure Source" is any machine or mechanism which is configured to provide a flow of liquid under pressure.

As used in this specification, the words "comprises", "comprising", and similar words, are not to be interpreted in an exclusive or exhaustive sense. In other words, they are intended to mean "including, but not limited to.

Any reference to prior art documents in this specification is not to be considered an admission that such prior art is widely known or forms part of the common general knowledge in the field.

The invention is further described with reference to the following example. It will be appreciated that the invention as claimed is not intended to be limited in any way by this example.

FIG. 1 is a schematic depiction of an apparatus for fabricating containers according to an exemplary embodiment of the invention. The molding apparatus 100 is broadly comprised of three sections: a mold section 101, a liquid injection section 102, and a hydraulic power section 103.

The mold section 101 comprises the mold 104, here comprised of a base mold segment 104A and the right and left lateral mold segments 104B & 104C. The mold segments 104A, 104B, & 104C are disposed in the mold carriers 104D & 104E. The mold carriers 104D & 104E serve to maintain the mold segments 104A, 104B, & 104C in a pre-determined relation to each other, as well as to permit a controlled motion of the lateral mold segments 104B & 104C relative to each other during the insertion of the preform 107 at the start of the molding cycle and the extraction of a finished container at its conclusion.

The mold segments 104A, 104B, & 104C are thus disposed so as to be mobile in a first type of motion relative to the overall structure of the apparatus (e.g. a pedestal). This type of motion and the articulation mechanisms employed to create it are generally well-known in the art, and so are not discussed here.

However, the left lateral mold segment 104C is also mobile in a second type of motion relative to the other two mold segments 104A & 104B, in that it is mobile between a position where the two lateral mold segments 10413 & 104C are pressed together tightly (depicted here by the left lateral mold segment 104C in solid lines) and another where they are not (depicted here by the left lateral mold segment 104C' in dashed lines). The separation d between the two positions of the left lateral mold segment 104C is the gap that is necessary to avoid the lateral mold segments 10413 & 104C binding against each other during operation of the apparatus 100. The means for creating this motion are discussed infra.

While in this embodiment only the left lateral mold segment 104C is mobile, it should be understood that in other embodiments any or all of the mold segments may be configured to be mobile, depending on the size and shape of the containers being fabricated and the other particular demands of the installation in question, with additional closure cylinders and other such devices furnished as appropriate.

Each of the mold segments 104A, 104B & 104C has a mold surface 105A, 105B, & 105C, respectively, which collectively define the mold cavity 106. Disposed within the mold cavity 106 is the preform 107. The preform 107 encloses a preform cavity 108, which communicates with an open end 109 of the preform 107. The preform 107 is disposed such that the majority of its length is within the mold cavity 106, with only a small portion of the open end 109 protruding through top of the mold 104.

The mold section 101 further comprises the injection head 110, which comprises an internal channel 111 that flares out into the nozzle 112. The nozzle 112 is disposed about the open end 109 of the preform 107 and pressed into the mold 104, creating a sealed fluid connection between the preform cavity 108 of the preform 107 and the internal channel 111 of the injection head 110.

The liquid injecting section 102 of the molding apparatus 100 is comprised primarily of the injection cylinder 113. The chamber 114 of the injection cylinder 113 is in communication with the liquid supply 115 through the supply line 116, and with the internal channel 111 of the injection head 110 through the injection line 117.

When the injection piston 118 is withdrawn from the injection cylinder 113, a quantity of liquid 119 is drawn from the liquid supply 115 through the supply check valve 120 and into the chamber 114. Backflow from the injection head 110 is prevented by the piloted injection valve 121, which opens when a pre-determined positive pressure is reached in the chamber 114.

When the injection piston 118 is subsequently advanced into the injection cylinder 113, the piloted injection valve 121 opens and the liquid 119 within the injection cylinder 113 is expelled at great pressure via the injection line 117 and the internal channel 111 of the injection head 110 through the nozzle 112 and into the preform cavity 108 of the preform 107. The preform 107 is thereby induced to expand, assuming the form of the mold cavity 106 as defined by the mold faces 105A, 105B, & 105C.

In certain embodiments, it may also be advantageous to provide a means for inducing a longitudinal stretching of the preform. In particular, it is advantageous to furnish a stretching rod which is advanced into the preform and urged against an internal surface thereof. This will induce and accelerate the longitudinal deflection of the preform during the injection of the injection liquid, optimizing the process for the production of elongated containers. The precise configuration of the injection head will thus vary according to the size and shape of the containers being produced by it.

The hydraulic section 103 of the molding apparatus 100 broadly comprises the hydraulic pump 122, the control valve 123, the motor cylinder 124, and the closure cylinder 125. In this embodiment, the closure cylinder 125 is incorporated within the left mold holder 104E. Also, in this embodiment the hydraulic pump 122 is an ordinary constant-displacement pump, drawing hydraulic fluid from the reservoir 126 and sending it to the control valve 123.

The control valve 123 is a standard four-port closed-center directional control valve, having three positions: a closed center section 127, a forward section 128, and a reversing section 129. The center section 127 is the default position of the control valve 123, maintained there by the centering springs 130A and 130B. The control valve 123 is deflected to side by the solenoids 130C and 130D, thereby placing either of the forward or reversing sections 128 and 129 in the hydraulic circuit as desired.

To the ports of the control valve 123 are connected four hydraulic lines: the pressure line 131, the return line 132, the extension line 133, and the retraction line 134. The extension line splits into two branches: the motor branch 133A which is connected to the motor cylinder 124; and the closure branch 133B, which is connected to the closure cylinder 125. Likewise, the return line 132 splits into the motor branch 134A and the closure branch 134B.

When the control valve 123 is disposed in the center position as shown here, the center section is configured to block off the extension and retraction lines 133 and 134, while connecting the extension and return lines 131 and 132 so as to redirect the pressurized hydraulic liquid issuing from the hydraulic pump 122 back to the reservoir 126.

When the control valve 123 is disposed in the forward position the forward section 128 is connected, pressurizing the extension line 131 and the associated motor and closure branches 133A & 13313 thereof. As a result, the closure piston 137 within the closure cylinder 125 is advanced from the closure cylinder 125, urging the left lateral mold segment 104C against the right lateral mold segment 10413 by way of the closure cylinder piston rod 138. Continued pressurization of the closure cylinder 125 holds the left lateral mold segment 104C against the right lateral mold segment 104B and thus maintains the mold 104 in a closed disposition.

As stated above, in this embodiment the right lateral mold segment 104B is fixed relative to the right mold holder 104D and the left lateral mold segment 104C is mobile relative to the left mold holder 104E by way of the action of the closure cylinder 125.

However, in certain embodiments it may be desirable to provide a second closure cylinder operating on the right lateral mold segment, to provide an augmented mold closure force. The exact configuration of the apparatus may be chosen according to the particularities of each application.

Concurrently to the pressurization of the closure cylinder 125, the motor cylinder 124 is also pressurized. This causes the motor piston 135 of the motor cylinder 124 to be advanced therefrom. The motor piston 135 is linked to the injection piston 118 of the injection cylinder 113 by the linkage 136, which pressurizes the liquid 119 for injection into the preform 107 as described above.

The preform 107 is thereby expanded into the mold cavity 106, forming a container (omitted from this diagram for clarity), while at the same time the force exerted on the lateral mold segments 104B & 104C by the closure cylinder 125 ensures that the force of the expanding preform 107 upon the mold surfaces 105A, 105B, & 105C does not result in the separation of the mold segments 104A, 104B, & 104C. The formation of a mold separation line on the resulting container is thereby avoided.

Furthermore, the provision of the closure cylinder 125 in the manner described will ensure that the lateral mold segments 104B & 104C are completely and tightly closed during each molding cycle as they undergo normal wear and tear over the course of their service life.

Preferably, the motor cylinder 124 and the injection cylinder 113 are provided as two separate components, to isolate the liquid injecting section 102 from the hydraulic section 103 and thereby eliminate the possibility of contamination due to leakage, seal wear, or other compromise of the mechanical integrity of the apparatus. Furthermore, it should be noted that, while in this embodiment the linkage 136 is a solid rod connecting the motor piston 135 to the injection piston 118, it may in other embodiments be advantageous to furnish a more complex means for linking the motor cylinder 124 to the injection cylinder 113. For instance, it may be advantageous to provide a limited-travel prismatic joint in the linkage, permitting one to vary the travel of the injection piston for a given travel of the motor piston and thereby utilize the apparatus to fabricate differently-sized containers. The precise configuration of the linkage between motor cylinder and injection cylinder for each application may be determined by one skilled in the art of mechanics.

At the conclusion of injection of the liquid 119 into the preform 107, the container is fully formed and must be removed from the mold 104. To achieve this, the control valve 123 is disposed in the reversing position, connecting the reversing section 129 to the hydraulic circuit. Since the motor cylinder 124 and closure cylinder 125 are here provided as double-acting cylinders, the motor cylinder 124 and closure cylinder 125 will reverse, thereby retracting the motor and closure pistons 135 and 137 into their respective cylinders 124 and 125.

Alternately, the motor and closure cylinders may be provided as single-acting hydraulic cylinders, being retracted at the conclusion of the injecting step by a spring force or the like. This will simplify the design of the hydraulic control circuit of the molding apparatus in that it eliminates the need for a reversing section and the associated return lines from the cylinders, and may thus be advantageous in certain other embodiments of the invention.

The retraction of the closure cylinder 125 will displace a portion of the mold 104 into a position where the two lateral mold segments 104B and 104C are no longer compressed against each other; an exaggerated depiction of this is shown in hatched lines by the left lateral mold segment 104C', the closure piston 137', and the closure piston rod 138'. This permits the lateral mold segments 104B & 104C to be separated and the mold cavity 106 opened to remove the container therein, preventing the mold segments 104A, 104B, & 104C from binding upon the container or upon each other. The retraction of the motor cylinder 124 will cause the injection piston 118 to be partially withdrawn from the injection cylinder 113, creating a vacuum and drawing a quantity of the liquid 119 from the liquid supply 115 into the chamber 114. Another preform 107 may be placed in the mold cavity 106 and the injection head 110 disposed thereupon, and the process repeated to fabricate another container in a subsequent cycle.

Of course, the invention is not limited to the embodiments described above and in the accompanying Figure. In particular, it will be readily understood that the hydraulic circuit described herein is merely exemplary and not in any way limiting or suggestive of a necessary arrangement of components. One skilled in the art will be readily able to configure the hydraulic components and hydraulic circuit so as to be optimized for any particular application or operating mode.

Although the invention has been described by way of example, it should be appreciated that variations and modifications may be made without departing from the scope of the invention as defined in the claims. Furthermore, where known equivalents exist to specific features, such equivalents are incorporated as if specifically referred in this specification.

The invention claimed is:
1. An apparatus for fabricating containers, comprising:
a plurality of mold segments, said plurality of mold segments defining a mold cavity substantially in the form of a container and configured to accommodate a substantially tubular preform having a preform cavity communicating with an open end;
an injection head, said injection head configured to cooperate with said open end of said preform and establish fluid communication therewith;
an injection cylinder, said injection cylinder comprising a chamber with a piston moveable therein and being disposed in fluid communication with said injection head, and further configured to inject a volume of liquid into said preform when said piston is advanced within said chamber;
a closure cylinder, said closure cylinder being configured to exert a force on at least one of the mold segments so as to maintain said mold segments in a closed disposition;
a motor cylinder comprising a piston, the piston of said motor cylinder driving said piston of said injection cylinder, the motor cylinder and closure cylinder being concurrently driven by a single pressure source.
2. The apparatus as claimed in claim 1, wherein said injection cylinder and said motor cylinder are provided as two separate components.

3. The apparatus as claimed in claim 1, wherein the piston of said motor cylinder is directly connected to the piston of said injection cylinder.

4. The apparatus as claimed in claim 1, wherein said motor cylinder and said closing cylinder are double-acting cylinders.

5. A method for the fabrication of a container, comprising the steps of:
   providing a substantially tubular preform having a preform cavity communicating with an open end (109);
   disposing said preform at least partially within a mold cavity substantially in the form of a container, said mold cavity defined by a plurality of mold segments;
   pressurizing a motor cylinder, a piston of the motor cylinder driving a piston of an injection cylinder and thereby pressurizing a quantity of a liquid within said injection cylinder, while concurrently pressurizing a closing cylinder adapted to exert a force upon at least one of said mold segments and thereby maintain said mold segments in a closed disposition; and
   injecting said quantity of liquid within said injection cylinder into said preform cavity of said preform, said preform being thereby induced to deform and assume the shape of the mold cavity.

6. The method as claimed in claim 5, further comprising after the injecting step, retracting the pistons of said motor cylinder and said closing cylinder.

7. The method as claimed in claim 6, wherein during said retracting step a volume of liquid is drawn into said injection cylinder.

8. The method as claimed in claim 5, further comprising the step of initiating prior to the injecting step and taking place concurrent to the injecting step advancing a stretching rod into said preform cavity of said preform, said stretching rod being urged against the surface of said preform cavity so as to induce said preform to deform along a longitudinal axis.

9. A container fabricated by the method of claim 5.

10. The apparatus as claimed in claim 2, wherein the piston of said motor cylinder is directly connected to the piston of said injection cylinder.

11. The apparatus as claimed in claim 2, wherein said motor cylinder and said closing cylinder are double-acting cylinders.

12. The apparatus as claimed in claim 3, wherein said motor cylinder and said closing cylinder are double-acting cylinders.

13. The method as claimed in claim 6, further comprising the step of initiating prior to the injecting step and taking place concurrent to the injecting step advancing a stretching rod into said preform cavity of said preform, said stretching rod being urged against the surface of said preform cavity so as to induce said preform to deform along a longitudinal axis.

14. The method as claimed in claim 7, further comprising the step of initiating prior to the injecting step and taking place concurrent to the injecting step advancing a stretching rod into said preform cavity of said preform, said stretching rod being urged against the surface of said preform cavity so as to induce said preform to deform along a longitudinal axis.

* * * * *